United States Patent [19]
Ludwig et al.

[11] Patent Number: 5,494,527
[45] Date of Patent: Feb. 27, 1996

[54] METHOD OF CLEANING AND MAINTAINING HOT WATER HEATERS

[75] Inventors: Jerome H. Ludwig, Paradise Valley; Edward C. Perry, Phoenix, both of Ariz.

[73] Assignee: H.E.R.C. Products Incorporated, Phoenix, Ariz.

[21] Appl. No.: 231,875

[22] Filed: Apr. 21, 1994

Related U.S. Application Data

[63] Continuation of Ser. No. 871,828, Apr. 21, 1992, abandoned.

[51] Int. Cl.$^6$ .............................. B08B 3/08; B08B 9/00; C02F 5/14; C23G 1/02
[52] U.S. Cl. ............ 134/3; 134/22.12; 134/22.14; 134/22.18; 134/22.19; 134/29; 134/41; 252/87
[58] Field of Search ............... 134/22.1, 22.14, 134/22.11, 3, 22.12, 22.18, 22.19, 41, 29; 252/79.2, 80, 87

[56] References Cited

U.S. PATENT DOCUMENTS

| | | | |
|---|---|---|---|
| 2,884,349 | 4/1959 | Axelrad | 134/22.11 |
| 3,424,688 | 1/1969 | Boiko | 134/3 |
| 3,443,992 | 5/1969 | Schmidt | 134/3 |
| 4,789,407 | 12/1988 | Boiko | 134/22.1 |
| 4,913,823 | 4/1990 | Lipinski et al. | 134/22.19 |
| 5,021,096 | 1/1991 | Abadi | 134/22.14 |
| 5,152,843 | 10/1992 | McDonald et al. | 134/22.12 |
| 5,154,197 | 10/1992 | Auld et al. | 134/22.18 |

FOREIGN PATENT DOCUMENTS

3420472A1  6/1984  Germany.

*Primary Examiner*—Zeinab El-Arini
*Attorney, Agent, or Firm*—Wood, Herron & Evans

[57] ABSTRACT

A method of cleaning and maintaining a hot water heater tank contaminated with water scale and sediment by introducing an aqueous acidic treatment solution, retaining the acidic solution for a sufficient time to dissolve or suspend said scale and sediment, and then draining the spent solution containing the dissolved or suspended scale and sediment to provide a clean hot water heater tank.

5 Claims, 1 Drawing Sheet

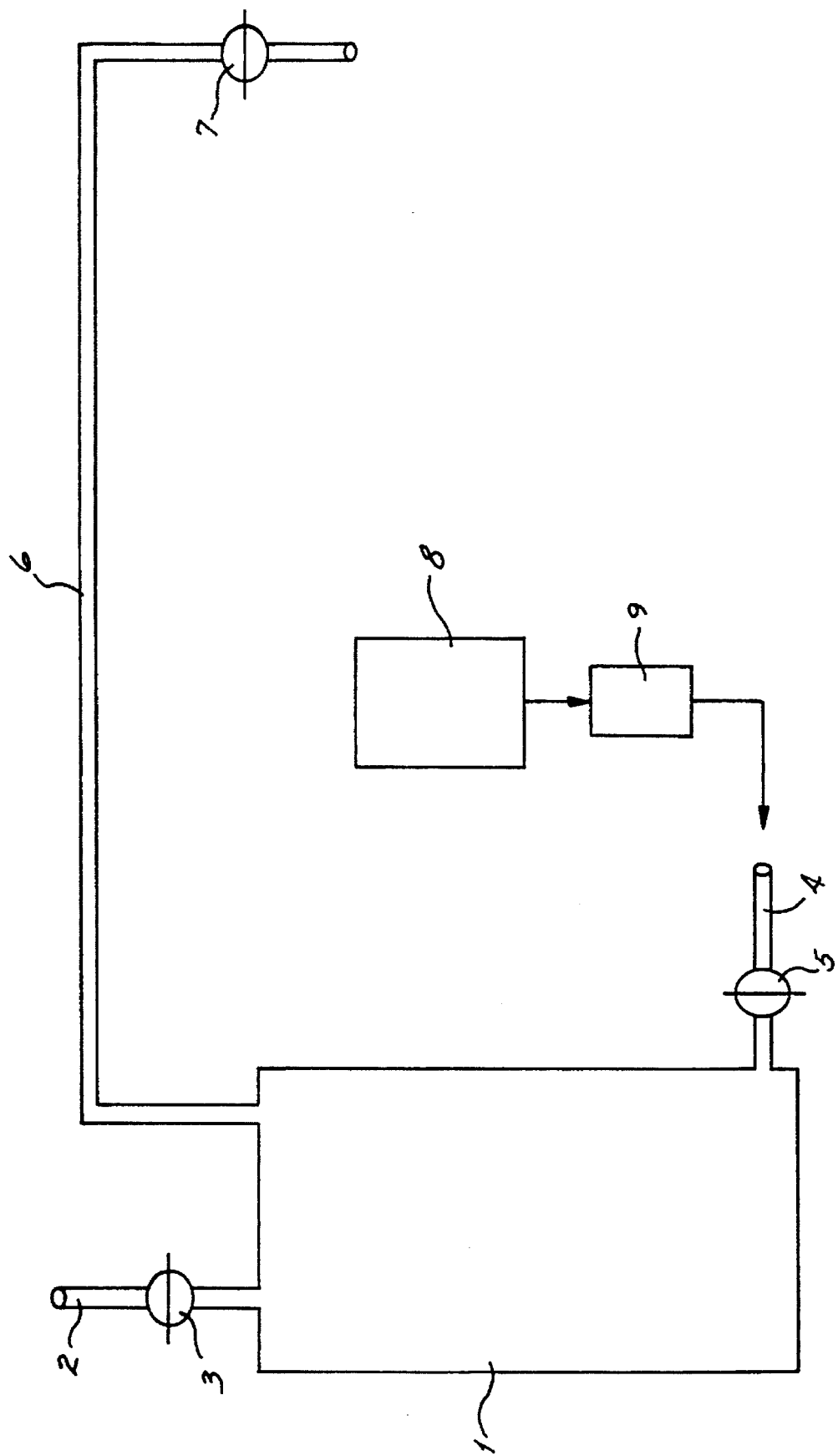

METHOD OF CLEANING AND MAINTAINING HOT WATER HEATERS

This application is a continuation, of application Ser. No. 871,828, filed Apr. 21, 1992 and now abandoned.

BACKGROUND OF THE INVENTION

It is well known that hardness in water sources varies widely in composition depending on the source and results in scale deposition and sedimentation wherever water is used. Scale deposition and sedimentation is particularly troublesome in residential and commercial hot water heaters. In these systems, the formation of hard water scale and sediment rapidly reduces the efficiency of heat transfer thus increasing the cost of heating the water either by gas or electricity. Also, scale and sedimentation will increase the possibility of corrosion in the water heater which will eventually result in leakage and the necessity of replacement.

There have been some physical means that have been developed to minimize the formation of scale and sediment in hot water heaters. The creation of a vortex by the water inlet stream has been used to generate a turbulence inside the tank during water addition which supposedly keeps the solids that are formed in suspension so that they can be removed in the water flow. This would only function during water flow and does not prevent sedimentation or scale formation on the heat exchange surface when water is not flowing. Other devices, such as magnets, have been employed to prevent hard scale deposits but are of questionable effectiveness and usually require frequent tank drainage.

Further improvements are needed for cleaning and/or maintaining hot water heaters free from scale and sediment.

SUMMARY OF THE INVENTION

This invention is directed to a method of cleaning and maintaining a hot water heater. Hot water heater tanks having interior contamination of water scale and sediment are cleaned by introducing an aqueous acidic treatment solution into the hot water heater tank in a sufficient amount for removal of the scale and sediment. The acidic treatment solution is retained in the heater tank for a sufficient time to dissolve or suspend the scale and sediment. Thereafter, the spent solution containing the dissolved or suspended scale and sediment is removed from the tank to provide a clean hot water heater. Mineral acids or organic acids, and mixtures thereof, are employed as the acidic treatment solutions according to the method. In another feature of the method, by checking the pH of the drained solution, it may be determined whether additional cleaning is necessary. The acidic treatment solution may contain further additives such as chelating agents and/or dispersing agents to assist in the removal of scale and sediment.

This invention provides a simple and effective method of removing water scale and sediment from hot water heater tanks in order to prevent loss of heat transfer efficiency and corrosion of the hot water tank. These and other advantages and objectives of this invention will be further understood with reference to the following detailed description.

BRIEF DESCRIPTION OF THE DRAWING

The FIGURE generally portrays a hot water heating system for maintaining and cleaning water scale and sediment from hot water heater tanks according to this invention.

DETAILED DESCRIPTION OF THE INVENTION

Among the acidic treatment solutions found to be useful in practicing the method of this invention are aqueous solutions of mineral acids such as hydrochloric, nitric, phosphoric, polyphosphoric, hydrofluoric, boric, sulfuric, sulfurous, and the like. Aqueous solutions of mono-, di- and polybasic organic acids have also been found to be useful and include formic, acetic, propionic, citric, glycolic, lactic, tartaric, polyacrylic, succinic, and the like. The useful treatment solutions may also be mixtures of the above mineral and organic acids.

Sequestering or chelating agents such as EDTA (ethylenediamine tetraacetic acid), NTA (nitrilotriacetic acid), and derivatives, and the like have also been found to be useful in the treatment solution in certain cases.

The treatment solution may also contain dispersing or emulsifying agents to assist in removal of the acid insoluble components of water scale and sediment when employing this method. Agents such as alkyl ether sulfates, alkyl sulfates, alkylolamines, ethoxylated alkylolamides, amine oxides, ammonium and alkali soaps, betaines, hydrotropes such as sodium xylene sulfonate, ethoxylated and propoxylated fatty alcohols and sugars, ethoxylated and propoxylated nonyl and octyl phenols, sulfonates, phosphate esters, quaternaries, sulfosuccinates, and mixtures thereof and the like are useful dispersing agents in the treatment solution for acid insoluble components of the scale and sediment.

Reference is now made to the FIGURE which generally portrays a hot water heating system that can be utilized to demonstrate the best mode of the invention for maintaining and cleaning water scale and sediment from hot water heater tanks. The components of the hot water heater system shown consist of hot water heater tank 1, water inlet pipe 2, water inlet valve 3, drain pipe 4, drain valve 5, hot water line 6, and hot water faucet 7. The method also requires a means 9 of connecting the treatment solution reservoir 8 to drain pipe 4 or drain valve 5, which can be accomplished by a variety of devices.

Since the water heater tank 1 is preferably emptied of water during the procedure of this invention, the heat source (gas or electric) is turned off prior to beginning the procedure.

A best mode of practicing this invention includes the following steps:

(1) Turn off water inlet valve 3, (2) Open hot water faucet 7, (3) Open drain valve 5 and drain water from hot water tank 1, hot water pipe 6 and hot water faucet 7 through drain pipe 4 thus providing an empty tank 1.

(4) Transfer the treatment solution from the treatment solution reservoir 8 through the transfer means 9, drain pipe 4 and open drain valve 5 into hot water tank 1.

(5) Then, preferably, close drain valve 5 and remove transfer means 9 and treatment solution reservoir 8.

(6) Allow the treatment solution to react with and digest the scale and sediment for a period of time.

(7) Drain the spent treatment solution containing the dissolved and suspended scale and sediment through drain pipe 4 by opening drain valve 5.

(8) Preferably, flush hot water tank 1 with water from the water inlet pipe by opening water inlet valve 3 and allowing the water to flow through hot water tank 1 and out drain valve 5 and drain pipe 4 to waste.

(9) After flushing, close drain valve 5 and allow the system to fill with water.

(10) When water flows from hot water faucet 7, close hot water faucet 7 and place the system back into service.

The above procedure is a general procedure and may be modified by one skilled in the art to accomplish the same results in the spirit of the invention depending on various conditions. For example, usually, in Step 3, it is preferred to connect a hose directly from drain valve 5 to waste (a drain) as most hot water heaters have a threaded drain valve exit rather than drain pipe 4.

In Step 4, the transfer of the treatment solution from the treatment solution reservoir can be accomplished in several ways. For example, it could be transferred by a pump through the appropriate hose connections. It could also be poured from the treatment solution reservoir (i.e., a bottle) into a funnel connected by a hose to drain valve 5 or drain pipe 4 using gravity to transfer the treatment solution. Alternatively, if the treatment solution is in a collapsible reservoir such as a plastic bag or a bag-in-a-box it could also be transferred by gravity through the appropriate hose connection to the drain valve 5 or drain pipe 4. Other techniques to transfer the treatment solution from the treatment solution reservoir may be employed.

It may also be desirable at this point to add water in a similar manner to the addition of the treatment solution in order to fill the hot water tank to the desired level for additional surface cleaning. This is particularly true for electrically heated water heaters that have heating elements which require scale removal and are several inches above the bottom of the hot water tank. The amount of treatment solution and/or the amount of water added will vary from hot water tank to hot water tank depending on the diameter of the tank, the height of the heating element from the bottom of the hot water tank, the amount of scale and sediment to be removed, etc. and can be determined by one skilled in the art.

As one dilutes the acid treatment solution with water, the reaction time required to achieve removal of the scale and sediment in Step 6 will increase. If the time allowed in Step 6 is adequate, the scale and sediment should be essentially removed during Step 7. By checking the pH of the spent treatment solution it can be determined if the solution is acidic, neutral or basic. If it is acidic, most of the scale and sediment should have reacted and be in solution or in a dispersed state. If it is near neutral or basic, additional treatment solution should be employed and Steps 4 through 7 repeated until the spent treatment solution is acidic.

Drainage of the hot water tank preferably can be accomplished by connecting one end of a hose directly to drain valve 5 (on the hot water heaters) and the other end to waste.

The hot water tank can be flushed in several ways in Step 8. For example, water can be added to the hot water tank through the water inlet pipe 2 and inlet valve 3. Water could also be added through the bottom drain valve 5 and drain pipe 4 in a manner similar to addition of the treatment solution. The hot water tank 1 could also be flushed by adding the water through the inlet valve 3 with the drain valve 5 closed and allowing the water to flow through the tank 1, hot water line 6 and out hot water faucet 7 to waste.

The method for removal of scale and sediment from hot water tanks should be repeated from time-to-time on a given hot water heater in order to maintain optimum operating efficiency with minimum corrosion risk. The period between treatments will vary depending on the hardness of the water, the temperature setting of the hot water heater and the amount of water passing through the system.

In view of the above description, other variations of the method will become apparent to a person of skill in the art without departing from the scope of this invention.

What is claimed is:

1. A method of cleaning and maintaining a hot water heater consisting of providing a hot water heater tank having an interior contaminated with water scale and sediment, said tank having a bottom drain and heating means near the bottom of the tank;

draining said water from said hot water heater tank to provide an empty tank;

introducing an aqueous acidic treatment solution of an acid selected from the group consisting of a mineral acid and an organic acid, and mixtures thereof, into said empty tank through said bottom drain and in the vicinity of said heating means in a sufficient amount for removal of said water scale and sediment from the tank bottom;

retaining said acidic treatment solution in said hot water heater tank for a sufficient time to dissolve or suspend said water scale and sediment;

draining said acidic treatment solution to provide a drained solution containing the dissolved or suspended water scale and sediment from said interior through said bottom drain to provide a drained tank;

checking the pH of the drained solution to determine whether additional treatment with acidic treatment solution is necessary to clean said hot water heater tank;

and flushing said drained tank with water for removal of any residual acidic treatment solution to provide a clean hot water heater tank.

2. The method of claim 1 further comprising adding said aqueous acidic treatment solution for continued removal of said scale and sediment.

3. The method of claim 1 wherein said mineral acid is selected from the group consisting of hydrochloric, nitric, phosphoric, polyphosphoric, hydrofluoric, boric, sulfuric and sulfurous acids, and mixtures thereof.

4. The method of claim 1 wherein said organic acid is selected from the group consisting of formic, acetic, propionic, citric, glycolic, lactic, tartaric, polyacrylic and succinic acids, and mixtures thereof.

5. The method of claim 1 wherein said acid treatment solution additionally contains an additive selected from the group consisting of a chelating agent and a dispersing agent, and mixtures thereof.

* * * * *